US010992517B1

(12) United States Patent
Watson et al.

(10) Patent No.: US 10,992,517 B1
(45) Date of Patent: Apr. 27, 2021

(54) DYNAMIC DISTRIBUTED EXECUTION BUDGET MANAGEMENT SYSTEM

(71) Applicant: Amazon Technologies, Inc., Seattle, WA (US)

(72) Inventors: Ryan F. Watson, Seattle, WA (US); Douglas Stewart Laurence, Mercer Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/901,987

(22) Filed: Jun. 15, 2020

(51) Int. Cl.
*H04L 12/24* (2006.01)

(52) U.S. Cl.
CPC ........ *H04L 41/0668* (2013.01); *H04L 41/042* (2013.01); *H04L 41/5096* (2013.01)

(58) Field of Classification Search
CPC ............... H04L 41/0668; H04L 41/042; H04L 41/5096
See application file for complete search history.

(56) References Cited

U.S. PATENT DOCUMENTS

| 9,979,617 | B1* | 5/2018 | Meyer | H04L 43/0817 |
| 2017/0228290 | A1* | 8/2017 | Maccanti | G06F 11/1469 |
| 2017/0357530 | A1* | 12/2017 | Shih | G06F 9/4887 |
| 2020/0068684 | A1* | 2/2020 | Ramer | H02J 13/00017 |
| 2020/0089545 | A1* | 3/2020 | Ahad | H04L 67/1008 |

* cited by examiner

*Primary Examiner* — Arvin Eskandarnia
*Assistant Examiner* — Chhian (Amy) Ling
(74) *Attorney, Agent, or Firm* — Knobbe, Martens, Olson & Bear, LLP (57) ABSTRACT

Systems and methods are provided for managing computing tasks in distributed computing systems using execution budgets. Execution budgets may include a budgeted number of operation retries that may be performed by a distributed computing system in response to failure of an operation, or a budgeted amount of time in which the distributed computing system may perform the operations of a computing task. The configuration of the distributed system to execute the computing task may be generated based on prior consumption of execution budgets by portions of the computing system.

20 Claims, 6 Drawing Sheets

DYNAMIC DISTRIBUTED EXECUTION BUDGET MANAGEMENT SYSTEM

BACKGROUND

Computing devices can utilize communication networks to exchange data. Companies and organizations operate communication networks that interconnect computing devices to support operations or to provide services to third parties. For example, a data center may include a number of interconnected computing systems to provide computing resources to internal and/or external users. In some implementations, performance of a computing task involves execution of multiple operations, and individual operations may be independent or dependent upon any of the other operations. Execution of the operations may be distributed among multiple physical and/or virtual computing devices in a single data center or across multiple data centers.

DETAILED DESCRIPTION

The present disclosure is directed to dynamic management of computing tasks in distributed computing systems using execution budgets. Execution budgets may include a budgeted number of operation retries that may be performed by a distributed computing system in response to failure of an operation, or a budgeted amount of time in which the distributed computing system may perform the operations of a computing task. The configuration of the distributed system for current or future executions of a computing task may be generated based on prior consumption of execution budgets by portions of the computing system during execution of the computing task. Generating the configuration may include selecting a particular host computing device to execute a portion of the computing task based on the prior performance of the host in terms of execution budget consumed. Generating the configuration may also and/or alternatively include determining the execution budget allotted to a particular host computing device or computing service based on the prior performance of the host or service in terms of execution budget consumed.

Distributed computing systems may be configured to perform computing tasks—such as execution of applications—as sets of individual operations distributed among any number of physical or virtual computing devices. Execution of the individual operations may be performed by different services, and each of the services may be implemented on one or more host computing devices. Therefore, a computing task that involves performance of a number of different operations may be distributed across multiple services implemented by multiple different host computing devices. The services may operate serially, in parallel, or asynchronously as needed. In addition, the services may operate independently, or they may be chained together such that the output of some services is provided as input to other services or otherwise affects the operation of other services. Thus, execution of a single application may be represented as an application graph of different application programming interface ("API") calls to different services, any of which may make calls to other services in a subgraph, and so on. In some distributed computing systems, each service may provide execution of a single operation or small number of operations (e.g., a computing task with 50 operations may be distributed among 10, 25, or 50 different services). Such services may be referred to as "microservices." A distributed computing system may implement dozens, hundreds, thousands, or more individual microservices. The execution of different applications may include the use of any or all of the microservices provided by the distributed computing system. In some cases, the microservices may be shared among any number of different applications.

Services and microservices (referred to herein under the umbrella term "services" for convenience) may fail for a variety of reasons, such as failure to connect to another component (e.g., another service), errors encountered during processing (e.g., exceptions, malformed input, etc.), timeout events, and the like. When a failure occurs at a particular service in an application graph, the failure may be passed up the graph to be handled by another service, or the failure may cause termination of the application. To avoid passing the failure to another service or causing application termination, some distributed computing systems permit or require a service to retry a failed operation. A service may retry a failed operation periodically after a predetermined or dynamically determined period of time. For example, the service may use a back-off algorithm, such as exponential back-off, to determine the period of time to wait before retrying the failed operation (e.g., n milliseconds, minutes, hours, etc., wherein n is a positive number). However, in a distributed system with a large number of services, and an application graph in which multiple services rely upon the successful completion of other services, a failure at one service (or failures at a small number of services) may cause failures other services, and may then cascade throughout the application graph. This cascade of failures may result in a relatively large number of retries being performed at different levels of the application graph. In some cases, the total volume of retries may reach a point where the entire distributed computing system, or sets of services provided by the distributed computing system, do little other than retry failed operations. This condition—which may be referred to as a "retry storm"—can degrade the performance of some or all of the distributed computing system, up to and including localized or system-wide outages.

In distributed computing systems, distributed execution budgets may be used to manage the retries of failed operations in a distributed computing system. A distributed execution budget may be an execution retry budget for an entire computing task. An execution retry budget specifying a maximum quantity of retry operations for the entire application graph may be set at the beginning of the computing task. Collectively, all of the services in the application graph may only retry failed operations up to the maximum quantity specified by the execution retry budget. Such an execution retry budget can be used to impose a limit on the total number of retries across the entire application graph, thereby reducing or eliminating the risk of a "retry storm" occurring when one or more services fail within a given period of time. In addition, the execution retry budget can be used to limit the amount of perceived latency for a given computing task before the task is terminated. Additionally or alternatively, a distributed execution budget may be a maximum duration of time within which a computing task is to execute. Such a distributed execution budget may be referred to as an execution duration budget. Collectively, all of the services in the application graph may be required to complete certain operations, such as the establishment of network connections to other services or the execution of functions by the service, within the maximum duration of time starting when the computing task is initiated (or when the first service is called, or at some other event). Such an execution duration budget can be used to impose a limit on the total execution time of an entire application graph, thereby reducing or eliminating the risk of a "retry storm" occurring when one or more services fail within a given period of time. Systems and methods for management of execution budgets are disclosed in commonly-owned U.S. patent application Ser. No. 16/781,864, filed Feb. 4, 2020 and titled "DISTRIBUTED EXECUTION BUDGET MANAGEMENT SYSTEM," the contents of which are incorporated by reference herein and made part of this specification.

Some aspects of the present disclosure relate to analyzing performance of computing services in terms of consumption of execution budgets during execution of computing tasks. When a computing service is called to execute a function as a portion of a computing task and is provided with an execution budget, the computing service can consume some or all of the execution budget in executing the function. Data regarding the performance of the computing service may be recorded and analyzed to determine whether adjustments to further calls to the service, and/or future determinations of execution budgets for the service, may be implemented. The performance data may represent the degree to which the computing service consumed the execution budget during execution of the function. The performance data for different services and/or different host computing devices of individual services may then be analyzed to determine their relative performance and/or to determine individual performance metrics. For example, a performance metric may represent the average amount of execution budget that a computing service or individual host computing device has consumed, and/or the amount of execution budget remaining after execution of the previous n requested functions. As another example, a performance metric may represent a decayed or other weighted average execution budget consumption (or remaining execution budget) in which older performance records are discounted with respect to newer performance records. As another example, a performance metric may indicate a relative rank of a service or host computing device with respect to other services or host computing devices used to perform the same function, similar functions, functions within the same or similar computing tasks, etc.

Additional aspects of the present disclosure relate to selecting individual host computing devices of a computing service based on analysis of performance of the host computing devices. When a first computing service determines that performance of a computing task includes requesting a second computing service to execute a function, the first computing service can determine which individual host of the second computing service is to be requested to execute the function. The determination may be based at least in part on the prior performance of the individual hosts of the second computing service such that better-performing hosts are more likely to be used than poorer-performing hosts. By biasing the selection of a host towards those hosts that exhibit better performance and away from those hosts that exhibit poorer performance, the overall performance of the distributed system can be improved by reducing failures and/or decreasing the amount of time required or quantity of retries performed to complete a computing task. In some embodiments, the selection may be a weighted randomized selection in which a host is selected using a pseudo-random algorithm in which each host computing device of the second computing service has a non-zero probability of being selected. The individual probability of each host computing device being selected may be weighted based on prior performance of the host computing devices such that better performing hosts are more likely to be selected, while worse-performing hosts still have a chance of being selected (and therefore improving their own performance metrics). In some embodiments, the selection may be a weighted round robin selectin in which each host computing device of the second computing service is selected in turn, with individual host computing devices being "skipped" on some turns on a predetermined or dynamically determined basis. The skipping of individual host computing devices may be based on the performance of the individual host computing devices such that better-performing host computing devices are skipped on fewer turns (or not at all) while worse-performing host computing devices are skipped on a greater number of turns.

Further aspects of the present disclosure relate to determining execution budgets for computing services or individual hosts based on analysis of prior performance of the computing services or individual hosts. When a first computing service determines that performance of a computing task includes requesting a second computing service to execute a function, the first computing service can determine an execution budget for the second computing service. The determination may be based at least in part on the prior performance of the second computing service—or individual hosts thereof—in executing the function such that poorer-performing services or hosts are provided with additional execution budget if doing so will not adversely affect other services. By basing the determination of an execution budget on prior performance, the amount of in-progress or completed work that is discarded or terminated due to a computing service exhausting its execution budget may be reduced if doing so will not cause the overall execution budget of a computing task (or multiple instances of the computing task over time) to be exceeded. Thus, the overall performance of the distributed system may be improved or maintained. In some embodiments, the determination may be based on a default or other previously-determined execution budget for execution of the function, and adjusted based on performance of the computing service in executing the function. For example, a default execution budget for a particular service may be increased if prior performance of the service has been poor relative to other services, and if increasing the execution budget for the service will not adversely affect (or substantially adversely affect) the performance of other services. As another example, the execution budget for a particular service may be increased for the current execution of the function and future execution budgets for the same service may be decreased if current performance of the service is expected to be poor relative to future performance. Thus, the overall performance of the distributed system over time may be maintained, even if individual computing tasks or functions experience poorer performance relative to a threshold or desired baseline.

Various aspects of the disclosure will now be described with regard to certain examples and embodiments, which are intended to illustrate but not limit the disclosure. Although aspects of some embodiments described in the disclosure will focus, for the purpose of illustration, on particular examples of services, distributed execution budget allocations, analysis of execution budget consumption, and adjustments to the configuration of a computing system to execute a task, the examples are illustrative only and are not intended to be limiting. In some embodiments, the systems and methods described herein may be applied to additional or alternative services, distributed execution budget allocations, analysis of execution budget consumption, adjustments to the configuration of a computing system to execute a task, and the like.

Distributed Computing System

Figure 1:
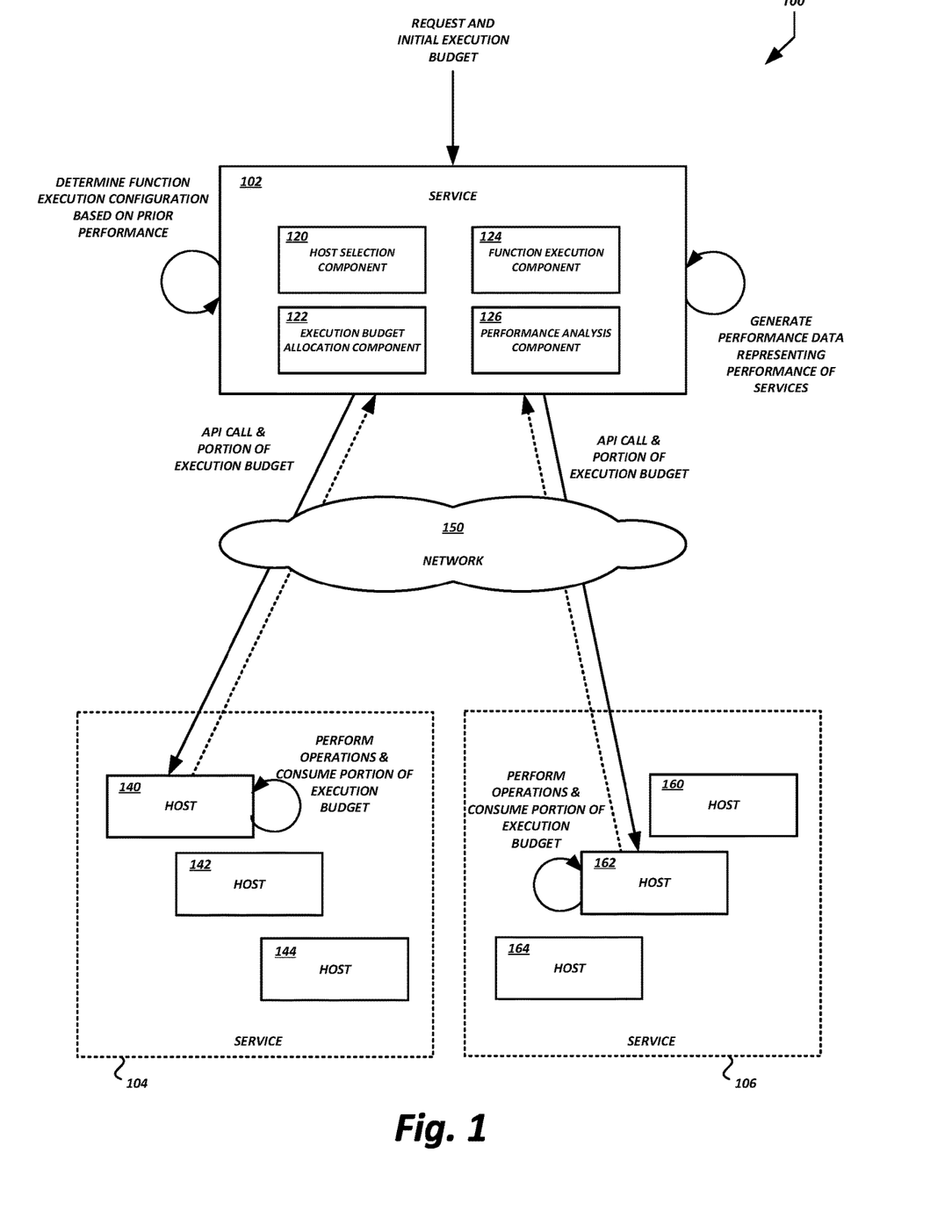
FIG. 1 illustrates a computing environment in which computing service hosts may be selected and/or distributed execution budgets may be determined based on prior performance according to some embodiments.

FIG. 1 is a block diagram showing a distributed computing system 100, including various computing services 102, 104, and 106. The computing services 102, 104, and 106 are also referred to herein simply as "services" for convenience. Individual services 102, 104, 106 may be configured to perform one or more computing operations. A single computing task executed by the distributed computing system 100, such as execution of an application, may involve a combination of the services 102, 104, 106 performing individual operations in contribution to execution of the computing task as a whole.

The services 102, 104, 106 may communicate with each other via one or more communication networks 150. A communication network 150, which is also referred to herein simply as a network 150 for convenience, may be or include a publicly-accessible network of linked networks, possibly operated by various distinct parties, such as the Internet. In some cases, the network 150 may be or include a private network, personal area network, local area network, wide area network, global area network, cable network, satellite network, cellular data network, etc., or a combination thereof, some or all of which may or may not have access to and/or from the Internet.

The components of the distributed computing system 100 may be implemented on one or more physical server computing devices. In some embodiments, individual services 102, 104, 106 or combinations thereof may be implemented on one or more host computing devices, such as blade servers, midrange computing devices, mainframe computers, or any other computing device configured to provide computing services and resources. For example, as shown, host computing devices 140, 142, and 144 may execute or otherwise host service 104, host computing devices 160, 162, and 164 may execute or otherwise host service 106, etc. Host computing devices may also be referred to as "host devices" or simply as "hosts" for convenience. As another example, a single host device may execute or otherwise host one or more services 102, 104, 106 or some combination thereof. The distributed computing system 100 may include any number of such hosts. Individual services may be implemented as virtual machines, applications, processes, and/or threads within a single host or across multiple hosts. Thus, calls among services may therefore be performed as inter process communications (e.g., messages or shared memory) among different virtual machines, applications, processes, and/or threads within a single host, or as calls across multiple hosts. Communications between services, regardless of the implementation of the different services on the same host or on different hosts, may be generally referred to as "inter service communications." In some embodiments, a distributed computing system 100 may include any combination of such service implementations, and an application graph may include any combination of such service implementations.

As shown, a service such as service 102 may include various components that perform operations of the service. In some embodiments, service 102 may include a host selection component 120 that selects individual hosts of other services from which to request execution of particular functions. In some embodiments, service 102 may include an execution budget allocation component 122 that determines portions of an overall execution budget for a computing task to be allocated to other services that execute individual functions in support of the computing task. In some embodiments, service 102 may include a function execution component 124 that executes a portion of the overall computing task being performed by the distributed computing system 100. In some embodiments, service 102 may include a performance analysis component 126 that generates and analyzes performance data regarding performance of services called by service 102. The example components shown in FIG. 1 are illustrative only, and are not intended to be required, exhaustive, or limiting. In some embodiments, a service may have fewer, additional, and/or alternative components, different services may include the same components as each other or different components from each other, etc.

In some embodiments, the features and services provided by the distributed computing system 100 may be implemented as web services consumable via one or more communication networks. In further embodiments, the computing services 102, 104, 106 are provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

Figure 2:
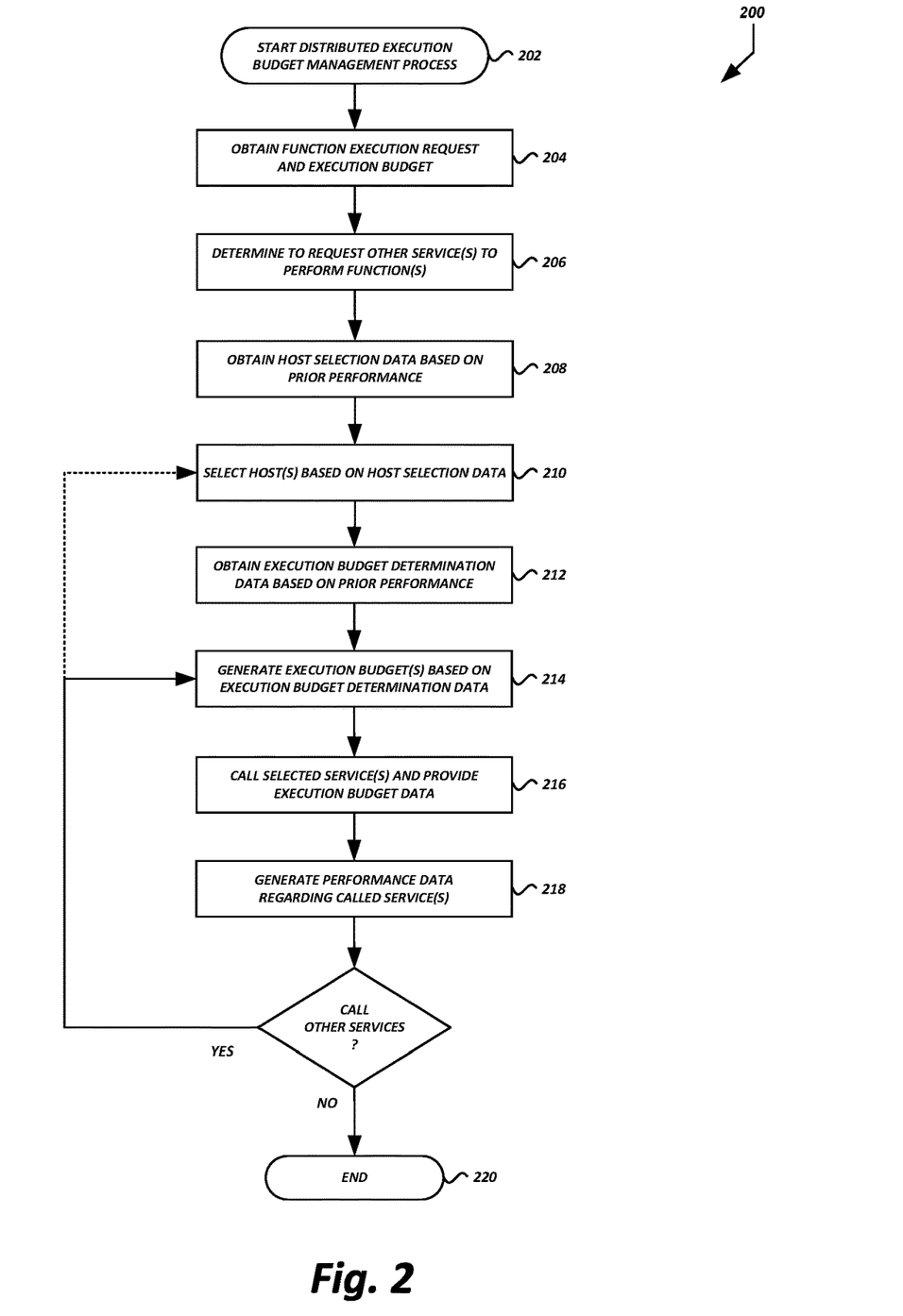
FIG. 2 is a flow diagram of an illustrative process for managing selection of computing services hosts and/or determining distributed execution budgets based on prior performance according to some embodiments.

In an illustrative embodiment, the distributed computing system 100 may provide an interactive web site to external users. A request for a web page may be received by service 102, which may be a web server. The web server may include any number of individual computing devices configured to receive and respond to requests for web pages. The web server may determine, or be provided with, execution budget data representing a distributed execution budget for the computing task of responding to the request for the web page. The distributed execution budget is also referred to herein simply as an "execution budget" for convenience. The execution budget may be a budget of operation retries that may be performed in response to certain events (e.g., connection failures, timeout events, etc.), a duration of time within which the computing task is to be performed (e.g., the total time from request for web page to response with requested web page), some combination of operation retries and duration of time, etc. While the web server performs its operations, it adjusts the execution budget accordingly to reflect any consumption of the execution budget. For example, the web server may reduce the execution budget to account for any operation retries performed, execution time used, etc. The web server can also select other services—or individual hosts thereof—and provide execution budget data representing the remaining execution budget—or some portion thereof—to the other services that it calls to execute functions in support of the computing task. An example of host selection and execution budget management is shown in FIG. 2 and described in greater detail below.

In preparing a response to the request for the web page, service 102 may determine that recommendations for the user are to be included in the web page, and dynamic content (e.g., breaking news, weather, sports scores, etc.) is to be included in the web page. Service 102 may determine that a request for recommendations is to be sent to service 104, which may be a recommendation server. Service 102 may also determine that a request for dynamic content is to be sent to service 106, which may be a dynamic content server. Service 102 may generate a function execution configuration based on prior performance of service 104 and/or 106. The function execution configuration may include individual hosts of service 104 and/or 106 selected to execute functions in support of service 102, execution budgets to be allocated to services 104 and/or 106 for performance of operations in execution of their respective functions, other information, or some combination thereof.

As shown, service 102 may choose an individual host of service 104, such as host 140. The selection may be based on prior performance of individual hosts 140, 142, 144 relative to each other such that better-performing hosts have a higher probably of being selected than poorer-performing hosts. Service 102 may choose an individual host of service 106, such as host 162. The selection may be based on prior performance of individual hosts 160, 162, 164 relative to each other such that better-performing hosts have a higher probably of being selected than poorer-performing hosts. In some embodiments, service 102 may not select any individual hosts based on prior performance, or may select individual hosts based on prior performance for only a subset of services to be called.

Service 102 may determine execution budgets for services 104, 106 based on prior performance of the individual services 104, 106 relative to each other. For example, if the execution budget is an execution retry budget and the services 104, 106 are to execute at partly in parallel or otherwise asynchronously, service 102 can split the available execution retry budget into equal or non-equal parts depending upon prior performance of the individual services 104, 106. If service 104 tends to take more retries than service 106, service 102 can allocate more of the execution retry budget to service 104 if doing so will not significantly increase the likelihood that service 106 will exhaust its entire portion of the execution retry budget and subsequently fail. In this way, the distributed computing system 100 can maintain a single cap on the total number of retires that are permitted, while increasing the likelihood of all services completing their requested functions successfully. As another example, if the execution budget is an execution duration budget and the services 104, 106 are to execute in serial or otherwise synchronously, service 102 can split the available execution duration budget into equal or non-equal parts depending upon prior performance of the individual services 104, 106. If service 104 tends to take more time to execute than service 106, service 102 can allocate more of the execution duration budget to service 104 if doing so will not significantly increase the likelihood that service 106 will exhaust its entire portion of the execution duration budget and subsequently fail. In this way, the distributed computing system 100 can maintain a single cap on the total duration of time permitted to perform the computing task, while increasing the likelihood of all services completing their requested functions successfully.

Service 102 may use the function execution configuration to generate requests to services 104, 106 for those services to execute functions. Included in a request, or otherwise provided to the called service or specific host, may be execution budget data representing the portion of the initial execution budget (e.g., operation retires, duration of time) available to the service or specific host to execute the requested function, and for any supporting services that it calls. The services 104, 106 may execute the requested functions, consuming some or all of their allotted execution budget as needed. In some embodiments, the services 104, 106 may provide a response to calling service 102. The response may be the output of a performed function. In addition, the response may include an indication of an amount of execution budget consumed (e.g., the number of operation retries that were performed, or the duration of time for which the service executed) and/or the amount of execution budget remaining, if any. Additionally or alternatively, the calling service 102 may determine the amount of execution budget consumed or remaining (e.g., the calling service 102 may track the duration of time from sending a request to a service 104, 106 to receiving a response from the service 104, 106).

Once services 104, 106 complete or fail, calling service 102 or some other component of the distributed execution system 100 can record performance data regarding the performance of the services. The performance data for any specific function may indicate the identity of the service performing the function, the identity of the specific host of the service performing the function, the identify the service or host that requested performance of the function, a timestamp regarding when the request was generated or received, a flag indicating success or failure of the function, the execution budget allotted for the function, the amount of execution budget exhausted and/or remaining (if any) after completion or failure of the function, other information, or some combination thereof. The performance data can be analyzed and used to make future decisions regarding specific hosts, execution budget allotments, and the like as described in greater detail below.

Example Distributed Execution Budget Management Routine

FIG. 2 is a flow diagram of an illustrative process 200 for managing selection of service hosts and/or determining execution budgets based on prior performance. Portions of the process 200 will be described with further reference to the illustrative data flows and interactions shown in FIGS. 3-7.

The process 200 begins at block 202. The process 200 may begin in response to an event, such as when a service of a distributed computing system begins operation. Although portions of the process 200 will be described as being performed by services illustrated in FIGS. 3-7, it will be appreciated that the process may be performed by a single computing device or subset of computing devices used to implement a given service. For example, when the process 200 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 800 shown in FIG. 8. The host selection instructions 814 and/or execution budget determination instructions 816 shown in FIG. 8 may be loaded into memory 810 of the computing device 800 and executed by one or more processors 802. In some embodiments, the process 200 or portions thereof may be implemented on multiple processors 802 and/or multiple computing devices 800, serially or in parallel.

At block 204, the computing device 800 can obtain a request to perform a computing task (e.g., execute a function). The request may be directed to the service generally and assigned to the computing device 800 (e.g., when multiple computing devices are configured to provide the functionality of the service), or the request may be directed to the computing device 800 specifically. The request may include, reference, or otherwise be associated with execution budget data that represents an execution budget allotted to the service and any supporting services that the service calls. In some embodiments, the request may be received as an application programming interface ("API") call, and execution budget data representing the execution budget may be included as a parameter of the call. In some embodiments, the computing device 800 may determine the execution budget after being called, based on a configuration of computing device 800, the service that the computing device is implementing, data obtained from a data store, or the like.

In some embodiments, the execution budget may be an execution retry budget specifying a maximum quantity of retry operations for the entire application graph that is invoked for the requested computing task. Collectively, all of the services in the application graph may only retry failed operations up to the maximum quantity specified by the execution retry budget. In some embodiments, the execution budget may be an execution duration budget specifying a maximum duration of time within which a computing task is to execute. Collectively, all of the services in the application graph may be required to complete certain operations, such as the establishment of network connections to other services or the execution of functions by the service, within the maximum duration of time starting when the computing task is initiated (or when the first service is called, or at some other event).

At block 206, the computing device 800 can determine that, to perform the requested computing task, one or more additional services are to be called to execute functions. For example, as shown in FIG. 1, service 102 may determine that service 104 is to execute a function, and service 106 is to execute a different function. The examples shown and described herein are illustrative only, and are not intended to be exhaustive, required, or limiting. In some embodiments, additional or fewer than two services may be called to execute functions in support of a requested computing task. Each called service, or some subset thereof, may call additional services to execute additional functions, those services may or may not call additional services, and so on as needed. The services may operate serially, in parallel, or asynchronously as needed. In addition, the services may operate independently, or they may be chained together such that the output of some services is provided as input to other services or otherwise affects the operation of other services.

At block 208, the computing device 800 can obtain host selection data for use in selecting a particular host of a service if a particular host is to be selected. Selection of a host may be made using an algorithm in which various parameters are used (e.g., weights or probabilities of selection), and those parameters are based at least in part on prior performance of individual hosts in executing the function to be executed and/or executing other functions.

Figure 3:
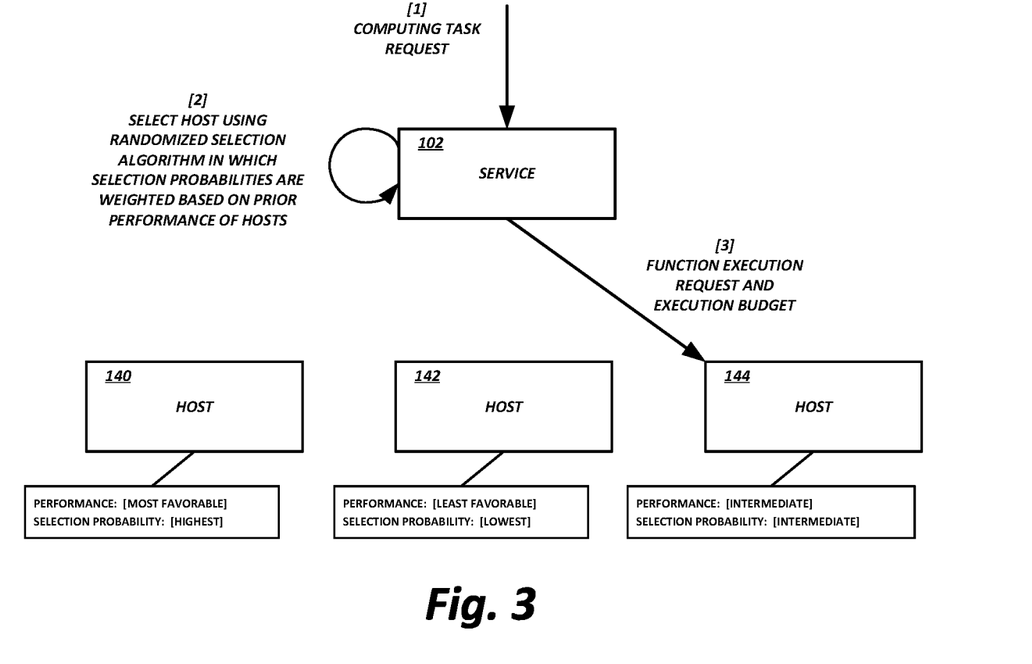
FIG. 3 is a block diagram of illustrative data flows and interactions during execution of a distributed computing task and selecting a computing service host using a randomized process according to some embodiments.

As shown in FIG. 3, a weighted randomized selection algorithm may be used. Each host 140, 142, 144 of computing service 104 may have a probability of selection. Better-performing hosts of the service may have a larger probability of being selected than worse-performing hosts of the same service. Performance of the individual hosts may be represented by a performance metric that is determined in terms of the amount of execution budget consumed or remaining when executing functions. In some embodiments, an average amount of execution budget consumed by individual hosts of a computing service during execution of a function may be determined. In some cases, an average amount of execution budget consumed by all hosts of the computing service during execution of a function may also or alternatively be determined. This allows comparison of individual hosts to each other and/or the overall average in order to identify better-performing and worse-performing hosts, and also to determine the degree to which hosts are better or worse performing with respect to other individual hosts or the average.

The data that is used to determine the performance metrics for the hosts may include all available performance data, or a subset of all available performance data. For example, only the n most recent records of performance data may be used, wherein n is some positive integer. As another example, only records of performance data that relate to function executions within n units of time of the present time may be used. As a further example, older performance records may be given less weight and newer records may be given more weight in generating the performance metric, such as by using a decay function (e.g., exponential decay) or weighted average. Records more than a threshold period of time older than a particular time (e.g., the present time, or the time of the most recent performance record) may be given such little weight that they do not have any effect on the calculation, or may be excluded altogether.

The host selection data that is obtained at block 208 may be the performance records for individual function executions, or it may be the performance metrics for individual hosts already computed. In some embodiments, the host selection data may be parameters to be used in the selection process based on the performance metrics, such as weights or biases determined using the performance metrics or performance records.

At block 210, the computing device 800 may select a particular host of a service to execute a function of the service. In the example shown in FIG. 3, a weighted randomized selection may be used to select an individual host of service 104. The weighting may be based on the performance metrics determined above such that better-performing hosts have a higher likelihood of being chosen than worse-performing hosts. For example, weighting factors, biases, or selection probabilities may be determined based on the respective performance metrics of individual hosts. To ensure that the best-performing host is not chosen every time, a pseudo-random number generator may be used in the weighted randomized algorithm such that each host of the service has a non-zero probability of being chosen, but no host has an absolute certainty of being chosen. Illustratively, host 140 may have a performance metric of 1.1, which may indicate consumption of 1.1 retries, on average, during performance of a function. Host 142 has a performance metric of 1.8, which may indicate consumption of 1.8 retries, on average, during performance of the function. Host 140 has a performance metric of 1.4, which may indicate consumption of 1.4 retries, on average, during performance of a function. Thus, host 140 has the best performance metric and the highest probability of selection, followed by host 144. Host 142 has the worst performance metric and lowest probability of selection. As shown in FIG. 3, due to the pseudo-random nature of the selection, host 144 may be selected during a given computing task even though it does not have the best performance metric or highest probability of selection.

Figure 4:
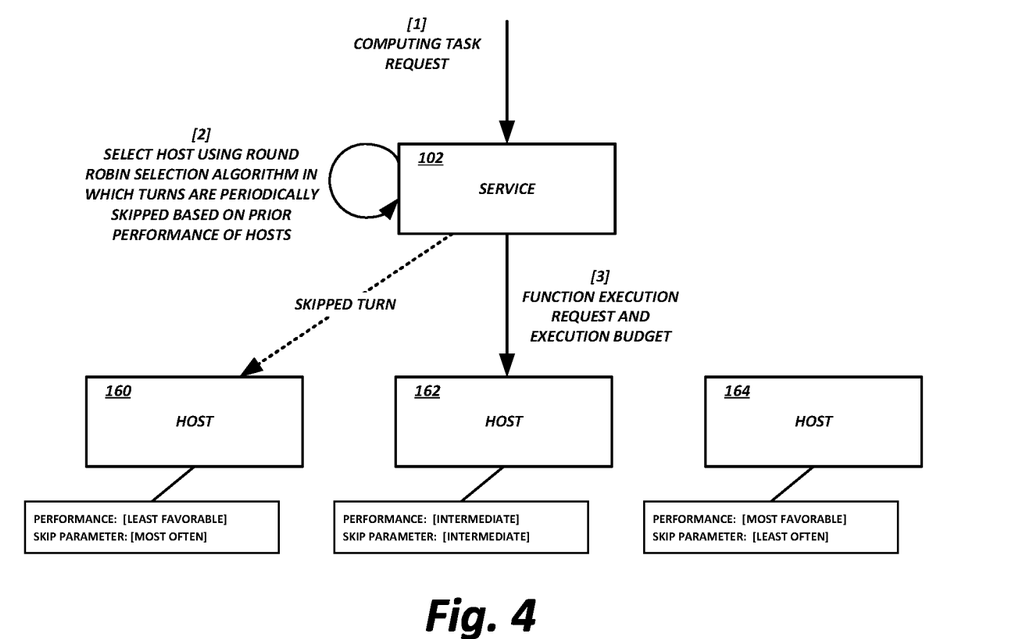
FIG. 4 is a block diagram of illustrative data flows and interactions during execution of a distributed computing task and selecting a computing service host using a round robin process according to some embodiments.

In some embodiments, a different method of selecting a host may be used. For example, as shown in FIG. 4, a weighted round robin selection algorithm may be used. In this case, the host selection data obtained at block 208 may be parameters to be used in the round robin selection of hosts. Each host 160, 162, 164 of computing service 106 may have a place in a round robin selection algorithm. Illustratively, host 160 may be first, host 162 may be second, host 164 may be third, and then the algorithm may return to host 160. In order to select better-performing hosts more often and worse-performing hosts less often, a parameter, such as a weight or skipping factor, may be assigned to each host or some portion thereof. The parameter may indicate that the host is to have its turn skipped every x number of trips around the round robin, or that the host is to be selected with a probability of y each trip around the round robin. Illustratively, host 160 may have a performance metric of 6, which may indicate consumption of 6 milliseconds of execution duration budget, on average, during performance of a function. Host 162 may have a performance metric of 4, which may indicate consumption of 4 milliseconds of execution duration budget, on average, during performance of a function. Host 164 may have a performance metric of 3, which may indicate consumption of 3 milliseconds of execution duration budget, on average, during performance of a function. A function may be used determine a selection parameter for each host based on the corresponding performance metric. For example, host 160 may have a selection parameter indicating that host 160 is to be skipped once every 20 turns around the round robin, host 162 may have a selection parameter indicating that host 162 is to be skipped once every 40 trips around the round robin, and host 164 may have a selection parameter indicating that it is to be skipped once every 50 trips.

At block 210, the computing device 800 may determine the next host of the service 106 to be selected according to the weighted round robin selection algorithm. In the present example, host 160 may be next in the round robin order. However, this may be the 20$^{th}$ turn since the last time host 160 was skipped. Thus, computing device 800 may instead select the next available host in the round robin (e.g., the next host that is not to be skipped). In this example, the next host that is not to be skipped may be host 162.

At block 212, the computing device 800 may obtain execution budget determination data for use in determining the execution budgets for services to be called. Determination of an execution budget may involve calculating a portion of an execution budget to be allocated to individual services to be called based on prior performance of the services. For example, determination of an execution budget may involve shifting a portion of an execution budget from a future execution of a function by a service—part of a future computing task that is separate from the current computing task that caused the process 200 to be initiated—to the current execution of the function by the same service, or to a current execution of a different function by a different service. As another example, determination of an execution budget may involve reserving a portion of an execution budget that would otherwise be allotted to a current execution of a function by a service, such that the reserved portion can be provided for a future execution of the same function by the same service, or be provided for a future execution of a different function by a different service. As another example, determination of an execution budget may alternatively involve shifting a portion of an execution budget to a first service from a second service that is to be called after execution of the function by the first service and part of the same computing task, or shifting a portion of the execution budget from the first service to the second service that is to be called after execution of the function by the first service. As a further example, determination of an execution budget may alternatively involve shifting a portion of an execution budget to a first service from a second service that is to be called in parallel or at least partly concurrently with execution of the function by the first service and part of the same computing task.

Figure 5:
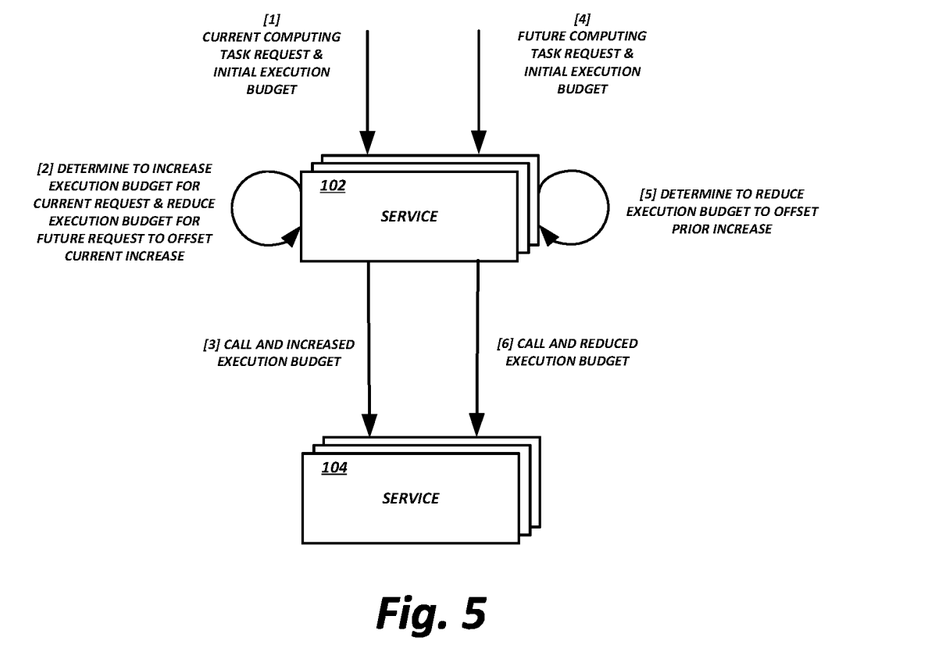
FIG. 5 is a block diagram of illustrative data flows and interactions during execution of a distributed computing task in which a current execution budget is generated and a future execution budget is modified according to some embodiments.

As shown in FIG. 5, an execution budget for a particular computing service 104 to perform operations of a particular function may involve shifting a portion of an execution budget from a future execution of the function by the service to the current execution of the function by the service. This shifting of execution budget units from a future execution to a current execution may be done for a variety of reasons. For example, current conditions for execution of a computing task may be such that it may be difficult to complete the computing task within a default or otherwise predetermined execution budget allotment, but completion of the computing task is still desirable even if additional execution budget may be required to be consumed. Moreover, future conditions may be expected to be such that the computing task is capable of being successfully completed with a smaller execution budget in the future. Examples of improving future conditions may include an expected overall improvement in system latency (e.g., during a period of less demand), or a different host of the service 104 with better performance than the current host is likely to be selected. Thus, the overall amount of work done by the service—and the distributed computing system as a whole—will not exceed the cumulative execution budget over multiple executions of the function, even if individual executions of the function exceed the default execution budget for a single execution of the function.

An execution budget for service 104 may be determined based on performance metrics representing performance of the service during prior execution of the same function (or, in some cases, performance of the service during prior execution of one or more functions that may or may not include the same function that the service will be requested to perform in this computing task). Performance metrics may be determined in terms of the amount of execution budget consumed or remaining when executing functions. In some embodiments, an average amount of execution budget consumed by the service during different periods of time may be determined. One period of time for which an average is determined may correspond to the current period of time (e.g., in terms of time of day, seasonality, current conditions, other context, or some combination thereof), while another period of time for which an average is determined may correspond to a future period of time (e.g., in terms of time of day, seasonality, expected future conditions, other context, or some combination thereof). This allows comparison of the current time to an expected future time in order to identify better-performing and worse-performing periods of time for the service.

In some embodiments, an average amount of execution budget consumed by individual hosts of the computing service during execution of a function may be determined. An average amount of execution budget consumed by all hosts of the computing service during execution of the function may also or alternatively be determined. This allows comparison of individual hosts to each other and/or the overall average in order to identify better-performing and worse-performing hosts, and also to determine the degree to which hosts are better or worse performing with respect to other individual hosts or the average.

The data that is used to determine the performance metrics may include all available performance data, or a subset of all available performance data. For example, only the n most recent records of performance data may be used for each period of time at issue, wherein n is some positive integer. As another example, only records of performance data that relate to function executions within n units of time of the present time may be used. As a further example, older performance records in each period of time may be given less weight and newer records may be given more weight in generating the performance metric, such as by using a decay function (e.g., exponential decay) or weighted average. Records more than a threshold period of time older than a particular time (e.g., the present time, or the time of the most recent performance record) may be given such little weight that they do not have any effect on the calculation, or may be excluded altogether.

The execution budget determination data obtained at block 212 may be the performance records for individual function executions, the performance metrics that are determined from the individual performance records, or execution budget determination parameters that are based on the performance metrics or individual performance records.

At block 214, the computing device 800 may determine the execution budget for the service 104 to be called (or a particular host thereof). In the example shown in FIG. 5, determination of the budget may include applying an adjustment to a default or otherwise predetermined execution budget, and making an adjustment (or storing a record indicating an adjustment) to be applied during a future execution budget determination process (e.g., during a future performance of block 214). In some embodiments, the computing device 800 may analyze expected performance of service 104 at the present time to determine an expected amount of execution budget to be consumed by the service 104. If the expected amount to be consumed is greater than a default or otherwise predetermined execution budget, then the computing device 800 can analyze the expected performance of the service 104 at a future time to determine an expected amount of execution budget to be consumed by the service 104 at the future time (e.g., during the next function execution, an average over the course of multiple function executions in a future time window, etc.). If the expected amount to be consumed at the future time is less than the default budget and the difference is sufficient to make up for the deficiency in the default execution budget for the current time, then the difference (or a portion thereof) may be shifted to the current time. As a result, the execution budget that is determined for the current execution of the function by the service 104 may be greater than a default execution budget. However, over time, the average execution budget may not exceed the default execution budget, and therefore the total amount of work done by the service may continue to satisfy the maximum that corresponds to the default execution budget.

In some embodiments, if the expected amount to be consumed at the present time is greater than a default or otherwise predetermined execution budget, then the computing device 800 can analyze the expected performance of one or more other services (e.g., service 106) at a future time to determine an expected amount of execution budget to be consumed by the other service(s) at the future time (e.g., during the next function execution, an average over the course of multiple function executions in a future time window, etc.). If the expected amount to be consumed by another service 106 at the future time is greater than its default budget and the excess budget at the future time is sufficient to make up for the deficiency in the default execution budget for service 104 at the present time, then the difference (or a portion thereof) may be shifted to the present time. In some embodiments, if the expected amount to be consumed at the present time is less than a default or otherwise predetermined execution budget, then the computing device 800 can analyze the expected performance of the service 104 (or one or more other services, such as service 106) at a future time to determine an expected amount of execution budget to be consumed by the service 104 at the future time (e.g., during the next function execution, an average over the course of multiple function executions in a future time window, etc.). If the expected amount to be consumed at the future time is greater than the default budget and the excess budget at the present time is sufficient to make up for the deficiency in the default execution budget for the future time, then the difference (or a portion thereof) may be reserved to be shifted to the future time.

Figure 6:
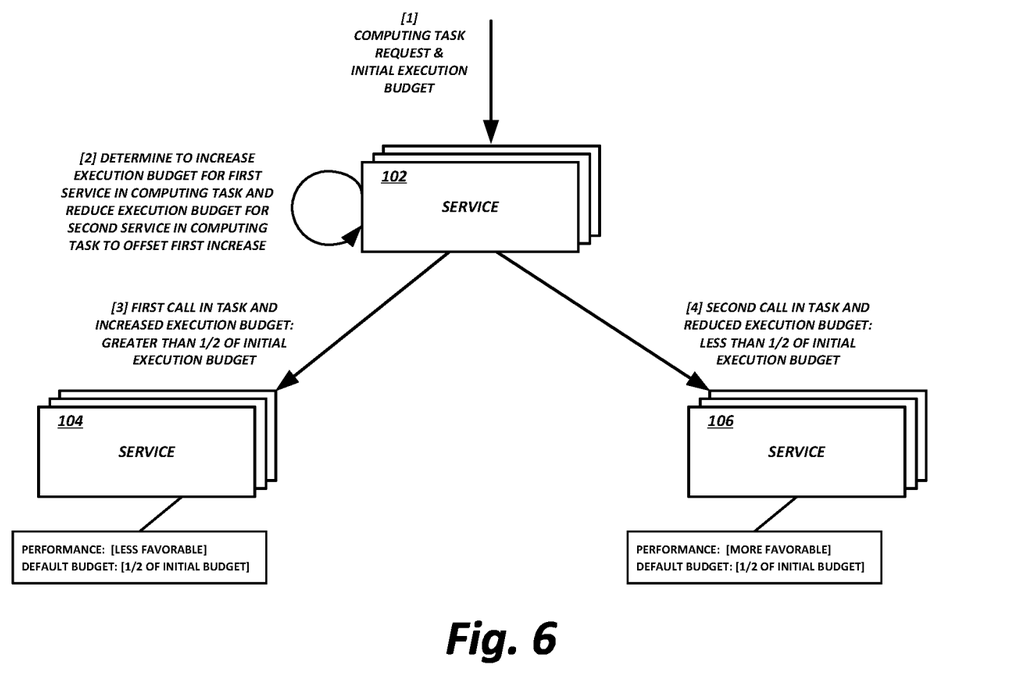
FIG. 6 is a block diagram of illustrative data flows and interactions during execution of a distributed computing task in which execution budgets for computing services to execute synchronously are generated according to some embodiments.

In some embodiments, a different method of determining an execution budget based on prior performance may be used. For example, as shown in FIG. 6, determining an execution budget for a particular computing service 104 to perform operations of a particular function may involve shifting a portion of an execution budget from another service 106 to be called during the computing task after service 104 completes execution. This shifting of execution budget units from a service to be called in the future during a computing task a service to be called earlier in the same computing task may be done for a variety of reasons. For example, performance of the earlier-called service 104 may have degraded such that it may be difficult for the service 104 to complete its function within a default or otherwise predetermined execution budget allotment, but completion of the function is still desirable even if additional execution budget may be required to be consumed. Moreover, the performance of the later-called service 106 may be such that the later-called service 106 is expected to successfully complete execution of its function with a smaller execution budget than would typically be assigned to it. Thus, the overall amount of work done by the services—and the distributed computing system as a whole—will not exceed the cumulative execution budget computing task, even if individual services exceed the default execution budget for a single execution of a function. In some embodiments, execution budget units may be shifted from an earlier-called service to a later-called service. For example, given the performance and default execution budgets described above, if service 106 is to be called prior to service 104, then execution budget units may be shifted from earlier-called service 106 to later-called service 104. In some embodiments, execution budgets may be shifted from multiple services to a single service. For example, given the performance and default execution budgets described above, if a third service was also expected to successfully complete execution of its function consuming a smaller portion of the execution budget than would typically be assigned to it, then a portion of the execution budget from the third service may be shifted to the execution budget of service 104 in addition to the portion of the execution budget from service 106 being shifted. In this way, the reduction in execution budgets can be shared across multiple services, reducing the effect of the reduction on a single service.

Execution budgets for service 104 and 106 may be determined based on performance metrics representing performance of the services during prior executions of the same functions that they are to execute during the current computing task (or, in some cases, performance of the services during prior execution of one or more functions that may or may not include the same functions that the services will be requested to perform in this computing task). Performance metrics may be determined in terms of the amount of execution budget consumed or remaining when executing functions. As described in greater detail above, the data that is used to determine the performance metrics may include all available performance data, or a subset of all available performance data.

In the example shown in FIG. 6, at the execution budget determination data obtained at block 212 may be the performance records for individual function executions, the performance metrics that are determined from the individual performance records, or execution budget determination parameters that are based on the performance metrics or individual performance records.

At block 214, the computing device 800 may determine the execution budget for the services 104, 106 to be called. Determination of the budgets may include applying an adjustment to a default or otherwise predetermined execution budget for service 104, and making a corresponding adjustment to a default or otherwise predetermined execution budget for service 106 (and, in some cases, other services). In some embodiments, the computing device 800 may analyze expected performance of service 104 to determine an expected amount of execution budget to be consumed by the service 104. If the expected amount to be consumed is greater than a default or otherwise predetermined execution budget, then the computing device 800 can analyze the expected performance of service 106 to determine an expected amount of execution budget to be consumed by service 106. If the expected amount to be consumed by service 106 is less than its default budget and the difference is sufficient to make up for the deficiency in the default execution budget for service 104, then the difference (or a portion thereof) may be shifted from the execution budget for service 106 to the execution budget for service 104. As a result, the execution budget that is determined for execution of the function by service 104 may be greater than a default execution budget. However, over the course of the entire computing task, the cumulative execution budget for all services (e.g., services 102, 104 and 106) may not exceed the execution budget allotted for the computing task, and therefore the total amount of work done by the service may continue to satisfy the maximum that corresponds to the default execution budget.

Figure 7:
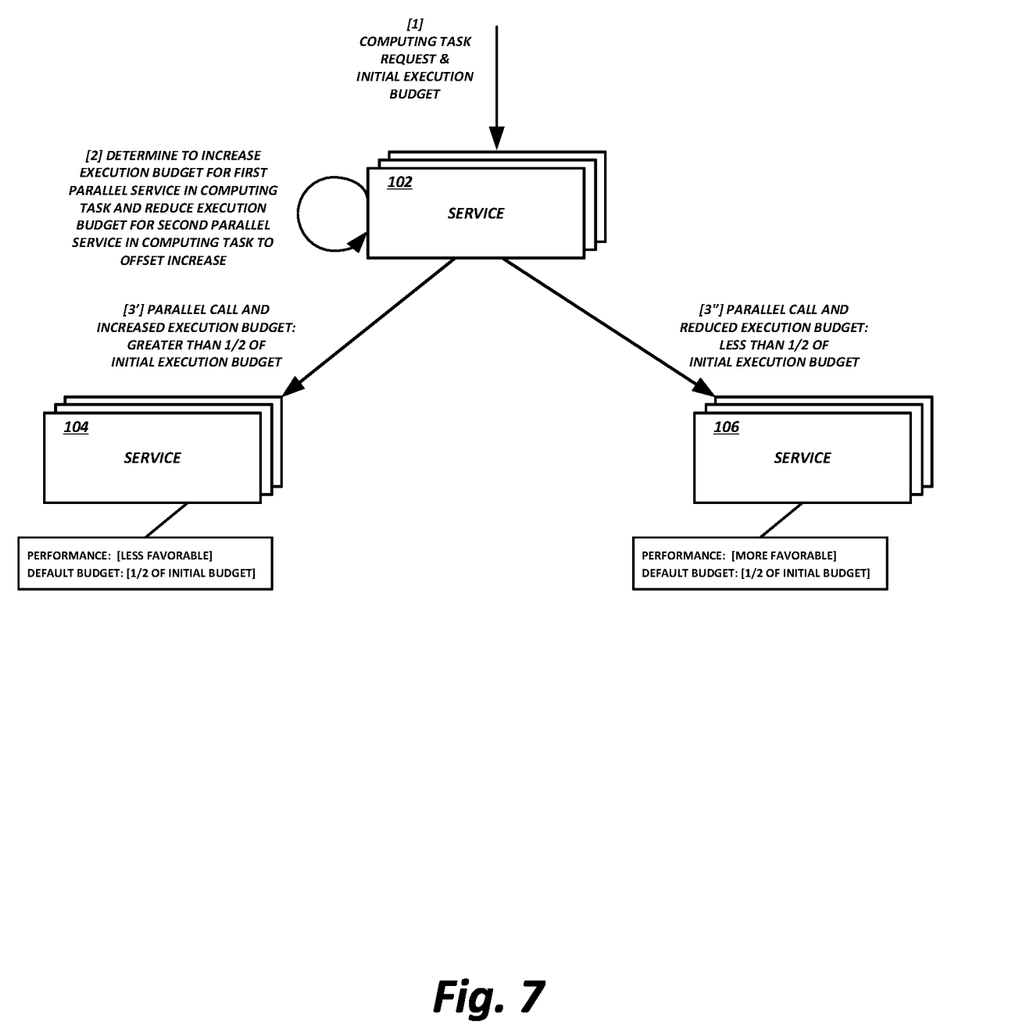
FIG. 7 is a block diagram of illustrative data flows and interactions during execution of a distributed computing task in which execution budgets for computing services to execute asynchronously are generated according to some embodiments.

In some embodiments, a different method of determining an execution budget based on prior performance may be used. For example, as shown in FIG. 7, determining an execution budget for a particular computing service 104 to perform operations of a particular function may involve shifting a portion of an execution budget from another service 106 that is to be called in parallel or at least partly concurrently (e.g., asynchronously) with service 104. This shifting of execution budget units from one service to another service that will be called or otherwise execute asynchronously may be done for a variety of reasons. For example, performance of one service 104 may have degraded such that it may be difficult for the service 104 to complete its function within a default or otherwise predetermined execution budget allotment, but completion of the function is still desirable even if additional execution budget may be required to be consumed. Moreover, the performance of another service 106 that will be called or otherwise execute asynchronously may be such that the other service 106 is expected to successfully complete execution of its function with a smaller execution budget than would typically be assigned to it. Thus, the overall amount of work done by the services—and the distributed computing system as a whole—will not exceed the cumulative execution budget computing task, even if individual services exceed the default execution budget for a single execution of a function. In some embodiments, execution budgets may be shifted from multiple services to a single service. In this way, the reduction in execution budgets can be shared across multiple services, reducing the effect of the reduction on a single service.

In the example shown in FIG. 7, at block 214 the computing device 800 may determine the execution budget for the services 104, 106 to be called. Determination of the budgets may include applying an adjustment to a default or otherwise predetermined execution budget for service 104, and making a corresponding adjustment to a default or otherwise predetermined execution budget for service 106 (and, in some cases, other services). In some embodiments, the computing device 800 may analyze expected performance of service 104 to determine an expected amount of execution budget to be consumed by the service 104. If the expected amount to be consumed is greater than a default or otherwise predetermined execution budget, then the computing device 800 can analyze the expected performance of service 106 to determine an expected amount of execution budget to be consumed by service 106. If the expected amount to be consumed by service 106 is less than its default budget and the difference is sufficient to make up for the deficiency in the default execution budget for service 104, then the difference (or a portion thereof) may be shifted from the execution budget for service 106 to the execution budget for service 104. As a result, the execution budget that is determined for execution of the function by service 104 may be greater than a default execution budget. However, over the course of the entire computing task, the cumulative execution budget for all services (e.g., services 102, 104 and 106) may not exceed the execution budget allotted for the computing task, and therefore the total amount of work done by the service may continue to satisfy the maximum that corresponds to the default execution budget.

At block 216, the computing device 800 can call one or more selected services and provide execution budget data representing the execution budget(s) determined above. The services may operate serially, in parallel, or asynchronously as needed. In addition, the services may operate independently, or they may be chained together such that the output of some services is provided as input to other services or otherwise affects the operation of other services. Each called service, or some subset thereof, may call additional services to execute additional functions, those services may or may not call additional services, and so on as needed. The downstream services may be provided with some or all of the execution budgets provided to the services called directly by service 102, may consume some or all of the execution budgets as needed, and may provide remaining execution budgets (if any) back to their calling services. Once the services called by service 102 have completed successfully or failed, service 102 may or may not be notified accordingly. For example, a called service such as service 104 may provide a notification back to service 102 indicating the amount of execution budget consumed or remaining (e.g., quantity of execution retries). As another example, a called service such as service 106 may not necessarily provide a notification to service 102 indicating the amount of execution budget consumed or remaining, but service 102 may determine the amount based on its own tracking (e.g., the total time elapsed between calling service 106 and receiving the output of the requested function from service 106).

At block 218, the computing device 800 can generate performance data regarding performance of the called service(s). In some embodiments, performance data may indicate the identity of the service performing the function, the identity of the specific host of the service performing the function, the identify the service or host that requested performance of the function, a timestamp regarding when the request was generated or received, a flag indicating success or failure of the function, the execution budget allotted for the function, the amount of execution budget exhausted and/or remaining (if any) after completion or failure of the function, other information, or some combination thereof.

At decision block 220, the computing device can determine whether there are additional services to be called. If so, the process 200 can return to block 210 to select a particular host, if applicable, or to block 214 to generate an execution budget for the service. Otherwise, if there are no additional services to be called, the process 200 may terminate at block 222.

Additional Embodiments

In some embodiments, the determination of which host is to be selected may be performed using a proportional—integral—derivative ("PID") controller. A PID controller may balance the selection of host devices by using a control loop mechanism that employs feedback. As the performance of the distributed computing system 100 changes, the PID controller may adjust the selection parameters used to select host computing device to avoid overshooting the desired load balance, such as may occur when the better-performing hosts are selected so often that their performance is negatively affected.

In some embodiments, the generation of execution budgets may be performed using a PID controller. The PID controller may balance the shifting of execution budget from one service or host to another service or host by using a control loop mechanism that employs feedback. As the performance of the services and/or the distributed computing system 100 as a whole changes, the PID controller may adjust the execution budget determination parameters to avoid overshooting the desired balance and negatively affecting the performance of the better-performing services or hosts.

In some embodiments, the determination of which host is to be selected may be performed using a machine learning component, such as a neural network. A machine learning component may analyze performance data over time, including performance data regarding computing tasks in which hosts have been selected based on prior performance. The machine learning component may incorporate a loss function to adjust its parameters based on the prior performance data and optimize future host selections.

In some embodiments, the generation of execution budgets may be performed using a machine learning component, such as a neural network. The machine learning component may analyze performance data over time, including performance data regarding computing tasks in which execution budgets were adjusted based on prior performance. The machine learning component may incorporate a loss function to adjust its parameters based on the prior performance data and optimize future execution budget determinations.

Example Computing Device Components

Figure 8:
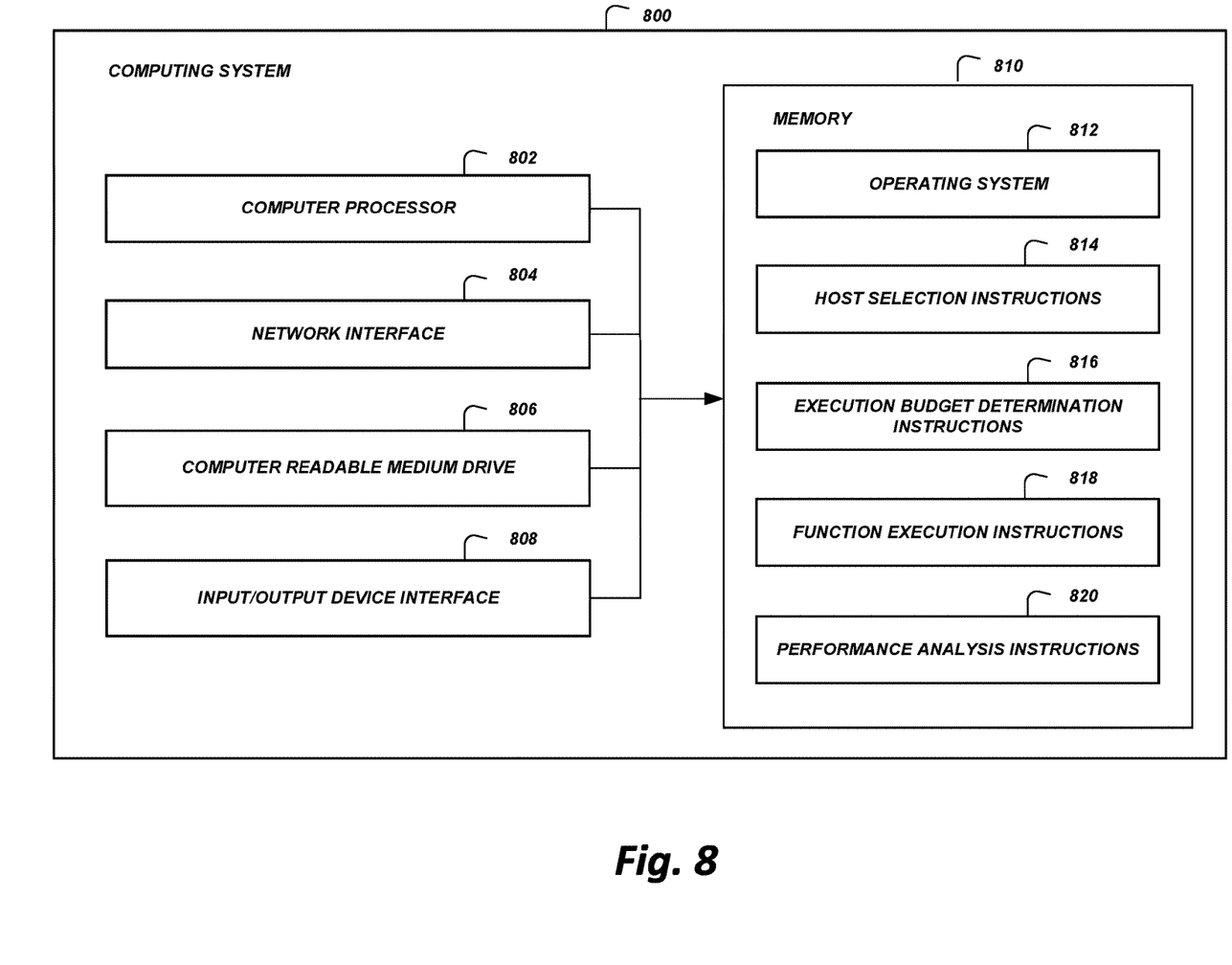
FIG. 8 shows an illustrative computing system configured to implement aspects of the present disclosure according to some embodiments.

FIG. 8 shows components of an illustrative computing device 800 that may be used to implemented aspects of the present disclosure. In some embodiments, a service of a distributed computing system may be implemented using one or more computing devices 800.

As shown, the computing device 800 may include: one or more computer processors 802, such as physical central processing units ("CPUs"); one or more network interfaces 804, such as a network interface cards ("NICs"); one or more computer readable medium drives 806, such as a high density disk ("HDDs"), solid state drives ("SDDs"), flash drives, and/or other persistent non-transitory computer-readable media; one or more input/output device interfaces 808, and one or more computer readable memories 810, such as random access memory ("RAM") and/or other volatile non-transitory computer-readable media. The computer readable memory 810 may include computer program instructions that the computer processor 802 executes in order to implement one or more embodiments. For example, the computer readable memory 810 can store an operating system 812 that provides computer program instructions for use by the computer processor 802 in the general administration and operation of the computing device 800. The computer readable memory 810 may also include host selection instructions 814 and/or execution budget determination instructions 816 for implementing features of the service, such as performing the process 200 shown in FIG. 2. The computer readable memory may also include function execution instructions 818 for executing a function as part of a distributed computing task. The computer readable memory may also include performance analysis instructions 820 for analyzing prior performance of services.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a computer processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A computer processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for managing distributed execution of computing services, the system comprising:
   a first computing service comprising a first plurality of host computing devices; and
   a second computing service comprising a second plurality of host computing devices;
   wherein the first computing service is configured to:
      receive a first request to execute a first function, wherein the first request is associated with first retry budget data representing a first maximum number of communication retry attempts permitted in response to inter service communication failures, and wherein execution of the first function comprises sending, to the second computing service, a second request to execute a second function;
      select a selected host computing device of the second computing service based at least partly on a prior performance of the selected host computing device executing the second function relative to prior performance of at least a subset of the second plurality of host computing devices executing the second function;

generate second retry budget data based at least partly on the prior performance of the selected host computing device executing the second function, wherein the second retry budget data represents a portion of the first maximum number of communication retry attempts to be allotted to the selected host computing device;

send the second request to the selected host computing device, wherein the second request is associated with the second retry budget data; and generate performance data representing consumption, by the selected host computing device, of one or more communication retry attempts represented by the second retry budget data.

2. The system of claim 1, wherein the first computing service further comprises a proportional-integral-derivative ("PID") controller configured to select the selected host computing device.

3. The system of claim 1, wherein to select the selected host computing device, the first computing service is configured to use one of: a weighted randomized selection algorithm in which a probability that the selected host computing device is selected is weighted based on the prior performance of the selected host computing device; or a round robin selection algorithm in which individual host computing devices of the second computing service are skipped based on prior performance of the individual host computing devices.

4. The system of claim 1, wherein to generate second retry budget data, the first computing service is configured to apply an adjustment to a default retry budget for the second function, wherein the adjustment is based at least partly on the prior performance of the selected host computing device.

5. A computing-implemented method comprising:
under control of a first computing service comprising one or more computing devices configured to execute specific instructions,
receiving a first request to execute a first function, wherein the first request is associated with first execution budget data representing a first execution budget for performing one or more operations during execution of the first function;
determining that execution of the first function comprises requesting a second computing service to execute a second function;
generating second execution budget data based at least partly on prior performance of the second computing service, wherein the second execution budget data represents a portion of the first execution budget to be allotted to the second computing service for performing one or more operations during execution of the second function; and
generating a second request to the second computing service to execute the second function, wherein the second request is associated with the second execution budget data.

6. The computer-implemented method of claim 5, further comprising generating performance data representing performance of the second computing service executing the second function.

7. The computer-implemented method of claim 6, wherein generating the performance data is based at least partly on analyzing consumption of the portion of the first execution budget by the second computing service.

8. The computer-implemented method of claim 6, further comprising selecting, based at least partly on the performance data and second performance data, a first host of the second computing service for a subsequent execution of the second function, wherein the second performance data represents performance of a second host of the second computing service executing the second function.

9. The computer-implemented method of claim 5, wherein generating the second execution budget data comprises determining a maximum duration of time for execution of the second function.

10. The computer-implemented method of claim 5, wherein generating the second execution budget data comprises determining a maximum number of retry operations permitted to be attempted during execution of the second function.

11. The computer-implemented method of claim 5, further comprising:
obtaining performance data representing the prior performance of the second computing service relative to prior performance of a third computing service,
wherein generating the second execution budget data based at least partly on the prior performance of the second computing service comprises applying an adjustment, based at least partly on the performance data, to a prior execution budget for the second function.

12. The computer-implemented method of claim 11, further comprising increasing a second portion of the first execution budget for performing one or more operations during execution of a third function by the third computing service, wherein the adjustment to the prior execution budget for the second function comprises a decrease.

13. The computer-implemented method of claim 11, further comprising decreasing a second portion of the first execution budget for performing one or more operations during execution of a third function by the third computing service, wherein the adjustment to the prior execution budget for the second function comprises an increase.

14. The computer-implemented method of claim 5, further comprising:
obtaining performance data representing prior performance of a first host of the second computing service relative to prior performance of a second host of the second computing service,
wherein generating the second execution budget data based at least partly on the prior performance of the second computing service comprises applying an adjustment, based at least partly on the performance data, to a prior execution budget for the second function.

15. The computer-implemented method of claim 14, further comprising generating third execution budget data representing an execution budget for performing one or more operations during a future execution of the second function by the second computing service, wherein the third execution budget data is generated based at least partly on a degree to which the prior execution budget is adjusted to generate the second execution budget data.

16. The computer-implemented method of claim 5, further comprising:
determining that execution of the first function further comprises requesting a third computing service to execute a third function concurrently with at least a portion of the second computing service executing the second function;

generating third execution budget data representing a second portion of the first execution budget to be allotted to the third computing service for performing one or more operations during execution of the third function; and generating a third request to the third computing service to execute the third function, wherein the third request is associated with the third execution budget data.

17. The computer-implemented method of claim 5, further comprising:

determining that execution of the first function further comprises requesting a third computing service to execute a third function subsequent the second computing service completing execution of the second function;

generating third execution budget data representing a second portion of the first execution budget to be allotted to the third computing service for performing one or more operations during execution of the third function; and generating a third request to the third computing service to execute the third function, wherein the third request is associated with the third execution budget data.

18. A computing system comprising:

a first computing service; and a second computing service;

wherein the computing system is configured to:

analyze first performance data regarding consumption of an execution budget allotted to a first host computing device of the second computing service for performing one or more operations during execution of a function;

analyze second performance data regarding consumption of the execution budget allotted to a second host computing device of the second computing service for performing one or more operations during execution of the function;

generate host selection data based at least partly on analyzing the first performance data and the second performance data;

receive, by the first computing service, a request to perform a computing task, wherein performing the computing task comprises requesting a host computing device of the second computing service to execute the function; and select, based at least partly on the host selection data, a selected host computing device to execute the function, wherein the selected host computing device comprises one of the first host computing device or the second host computing device.

19. The computing system of claim 18, further configured to select the selected host computing device using a weighted randomized selection algorithm in which a probability that the selected host computing device is selected is weighted based on the host selection data.

20. The computing system of claim 18, further configured to select the selected host computing device using a round robin selection algorithm in which individual host computing devices of the second computing service are skipped based on the host selection data.

\* \* \* \* \*